US012677985B2

(12) United States Patent
Standaar et al.

(10) Patent No.: US 12,677,985 B2
(45) Date of Patent: Jul. 14, 2026

(54) OUTLET NOZZLE ARRANGEMENT FOR A DRINK DISPENSING APPARATUS

(71) Applicant: Koninklijke Douwe Egberts B.V., Utrecht (NL)

(72) Inventors: Koen Standaar, Utrecht (NL); Hendrik Johan Dees, Utrecht (NL); Tobias Kelderman, Nieuw-Vennep (NL); Bas Jongenburger, Nieuw-Vennep (NL); Boris Franzen, Nieuw-Vennep (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 123 days.

(21) Appl. No.: 18/694,389

(22) PCT Filed: Sep. 21, 2022

(86) PCT No.: PCT/EP2022/076220
§ 371 (c)(1),
(2) Date: Mar. 21, 2024

(87) PCT Pub. No.: WO2023/046749
PCT Pub. Date: Mar. 30, 2023

(65) Prior Publication Data
US 2024/0398158 A1 Dec. 5, 2024

(30) Foreign Application Priority Data
Sep. 21, 2021 (GB) ...................................... 2113470

(51) Int. Cl.
*A47J 31/60* (2006.01)
*A47J 31/44* (2006.01)
(Continued)

(52) U.S. Cl.
CPC ........... *A47J 31/60* (2013.01); *A47J 31/4485* (2013.01); *A47J 31/46* (2013.01); *B08B 9/023* (2013.01);
(Continued)

(58) Field of Classification Search
CPC ........ A47J 31/60; A47J 31/4485; A47J 31/46; B08B 9/023; B08B 9/0323;
(Continued)

(56) References Cited

U.S. PATENT DOCUMENTS

| | | | | |
|---|---|---|---|---|
| 5,226,565 A | * | 7/1993 | Hladis | ..................... B05B 15/55 239/112 |
| 6,957,781 B2 | * | 10/2005 | Gowens | ................ F23D 11/386 239/113 |
| 2004/0118291 A1 | | 6/2004 | Carhuff | |

FOREIGN PATENT DOCUMENTS

| | | |
|---|---|---|
| CH | 707837 A1 | 9/2014 |
| CN | 110582216 | 12/2019 |

(Continued)

OTHER PUBLICATIONS

International Search Report and Written Opinion, date of mailing Dec. 21, 2022, International Application No. PCT/EP2022/076220 (13 pgs.).

(Continued)

*Primary Examiner* — David J Walczak
(74) *Attorney, Agent, or Firm* — Fitch, Even, Tabin & Flannery LLP

(57) ABSTRACT

A drink dispensing apparatus includes a nozzle arrangement comprising a plurality of nozzles, wherein at least one of the plurality of nozzles is an outlet nozzle for dispensing a drinkable fluid and wherein at least one of the plurality of nozzles is a cleaning return nozzle; and a cleaning chamber housing repeatably movable between a stowed position and (Continued)

a deployed position for cleaning the nozzle arrangement. The cleaning chamber housing includes an internal cavity in which the plurality of nozzles are sealably received when in the deployed position.

19 Claims, 4 Drawing Sheets

(51) Int. Cl.
|  |  |
|---|---|
| *A47J 31/46* | (2006.01) |
| *B08B 9/023* | (2006.01) |
| *B08B 9/032* | (2006.01) |

(52) U.S. Cl.
CPC ...... *B08B 9/0323* (2013.01); *B08B 2209/032* (2013.01)

(58) Field of Classification Search
CPC ............ B08B 2209/032; B08B 9/0328; B08B 9/0325; B08B 9/032

USPC .................... 222/1, 148; 137/237, 240, 246; 134/167 R, 166 R, 168 C, 167 C
See application file for complete search history.

(56) References Cited

FOREIGN PATENT DOCUMENTS

| CN | 110612049 | 12/2019 |
|---|---|---|
| DE | 102019104976 A1 | 8/2020 |
| WO | 2018208156 A1 | 11/2018 |
| WO | 2018208157 A1 | 11/2018 |

OTHER PUBLICATIONS

United Kingdom Search Report dated Dec. 8, 2021, United Kingdom Application No. GB2113470.5 (3 pgs.).
English translation of Chinese Office Action dated Apr. 8, 2026, Chinese Patent Application No. 202280063937.6, 9 pgs.

* cited by examiner

300

OUTLET NOZZLE ARRANGEMENT FOR A DRINK DISPENSING APPARATUS

CROSS REFERENCE TO RELATED APPLICATIONS

This application is a U.S. national phase application of International Application No. PCT/EP2022/076220, filed Sep. 21, 2022, which claims benefit from United Kingdom Application No. 2113470.5, filed Sep. 21, 2021, which are each hereby incorporated herein by reference in their entirety.

TECHNICAL FIELD OF THE INVENTION

The present disclosure relates to an outlet nozzle of a drink dispensing apparatus which is configured to be cleaned by a cleaning fluid.

BACKGROUND TO THE INVENTION

Drink dispensing apparatuses which prepare and dispense beverages are well known in the art. Typically, these machines include one or more outlet nozzle from which a beverage is dispensed into a receptacle. The outlet nozzles require periodic cleaning in order to maintain the quality of the beverages.

WO2018/208156 describes an apparatus for preparing a beverage including at least one beverage outlet nozzle for discharging the beverage into a beverage container and a cleaning structure for cleaning an exterior surface of the beverage outlet nozzle. The cleaning structure is movable from an idle position to a cleaning position by use of a cam wheel and a pair of support members arranged to pivot the cleaning structure forwards. When in use, the cleaning structure provides a sealed cavity for each nozzle to allow for cleaning of the exterior of each nozzle, and a common drain from which spent cleaning fluid can drain under gravity.

CH707837 discloses a drinks machine which comprises a downwardly directed outlet for dispensing a drink prepared in the drinks machine into a vessel below. A tub is arranged in the area of the outlet, which moves between a first position in which the prepared drink is dispensed, and a second position in which the tub is below the outlet and fillable with fluid for cleaning. Once cleaning is complete, the tub is moved back to the first position causing fluid to be tipped from the tub into a drain.

The present invention seeks to provide an improved outlet nozzle arrangement for a drink dispensing apparatus.

SUMMARY OF THE INVENTION

The present invention provides a drink dispensing apparatus according to the appended claims.

The present disclosure provides a drink dispensing apparatus. The drink dispensing apparatus may comprise: a nozzle arrangement comprising a plurality of nozzles, wherein at least one of the plurality of nozzles is an outlet nozzle for dispensing a drinkable fluid and wherein at least one of the plurality of nozzles is a cleaning return nozzle. The drink dispensing apparatus may comprise: a cleaning chamber housing repeatably movable between a stowed position and a deployed, cleaning position. The cleaning chamber housing may comprise an internal cavity in which the plurality of nozzles are received when in the deployed position. The internal cavity may be sealed.

The cleaning return nozzle may be configured to remove cleaning fluid from the cleaning chamber housing. The cleaning return nozzle may extract the cleaning fluid via suction. The cleaning return nozzle may be in fluid communication with a pump.

The cleaning chamber housing may comprise a base and at least one sidewall. The sidewall may extend upwardly from the base. The base and the sidewall may define the internal cavity.

The plurality of nozzles may be configured to extend into the internal cavity when the cleaning chamber housing is in the deployed position. The cleaning return nozzle may be provided at the lowest point of internal cavity relative to the at least one outlet nozzle. The cleaning return nozzle may be located within a sump area of the cleaning chamber housing. The sump may be the lowest portion of the cleaning chamber housing into which cleaning fluid can flow from the outlet nozzles. The cleaning return nozzle may be proximate to the cleaning chamber housing base.

The internal cavity may comprise a peripheral seal which seals against the nozzle arrangement so as to collectively seal the plurality of nozzles within the internal cavity. The peripheral seal may be provided at an upper edge of the cleaning chamber housing sidewall. The peripheral seal may encircle the plurality of nozzles when the cleaning chamber housing is in the deployed position. The seal may comprise a seal element such as an O-ring or gasket. The seal element may urge against a corresponding seal surface of the nozzle arrangement.

The plurality of nozzles may extend from a proximal end attached to a body of the nozzle arrangement to a distal end in which the distance between the proximal end and distal end defines a length of each nozzle. The cleaning return nozzle may have a length which is the greatest out of the plurality of nozzles.

The plurality of outlet nozzles may comprise at least one or more of the group comprising: a coffee outlet nozzle, a chocolate outlet nozzle, a milk outlet nozzle, a water outlet nozzle. The water outlet nozzle may be configured to provide the cleaning return nozzle in some embodiments. The or each of the plurality of outlet nozzles may be configured to provide a cleaning fluid during a cleaning process.

The cleaning chamber housing may comprise a well for each of the outlet nozzles. Each well may comprise a well sidewall defining a cleaning cavity which receives a terminal end of the respective outlet nozzle. The well sidewall may be configured to redirect cleaning fluid ejected from the respective nozzle outlet along an exterior surface of the respective outlet nozzle.

Each well may comprise a well base. The well base being elevated with respect to a base of the cleaning chamber housing. The well may comprise or be formed as part of a pedestal or upstand which extends from the base of the cleaning chamber housing. The pedestal may be a cylindrical pillar. The well may comprise a recess in a terminal end of the pedestal.

Each well sidewall may comprise a well drain from which residual cleaning fluid can flow out of the well into the cleaning chamber housing. The well drain comprises an aperture in the sidewall of each well. The aperture may be a notch which extends from an upper edge of the sidewall to the base. The drain may face the cleaning return nozzle so as to direct an outflow of residual cleaning fluid towards the cleaning return nozzle.

The apparatus may further comprise a drive mechanism operable to move the cleaning chamber housing between the stowed position and the deployed position. The drive mechanism may be a reciprocating drive such that the cleaning chamber housing is repeatedly movable between the stowed position and deployed position and vice-versa.

The drive mechanism may comprise a shuttle track along which the cleaning chamber housing is driven to move between the stowed and deployed positions. The shuttle track may be curved. The drive mechanism may further comprise a drive arm which is rotatable so as to slide the cleaning chamber housing along the shuttle track. The drive arm may be coupled to the cleaning chamber housing via a drive link. The drive link may be pivotably connected to the drive arm and cleaning chamber housing at respective ends thereof. The drive link may be configured to articulate relative to the drive arm and cleaning chamber housing during actuation of the drive arm. The drive arm may be rotated by an electric motor. The electric motor may connect to the drive arm via a worm drive. The worm drive may comprise a worm screw and a worm gear. There may be a plurality of drive arms, one on either side of the cleaning chamber housing, each of the plurality of drive arms configured to drive the cleaning chamber housing along respective corresponding shuttle tracks on either side of the cleaning chamber housing. Each of the drive arms may be rotated by a common actuator.

The shuttle track may receive a shuttle engagement member of the cleaning chamber housing. The shuttle engagement member may be configured to rotate in and slide along the shuttle track under the influence of the drive arm. Hence, as the cleaning chamber housing is urged along the shuttle track by the drive arm, the cleaning chamber housing is rotated relative to the shuttle track as it traverses along the shuttle track.

The shuttle engagement member may be located above a sealing surface of the cleaning chamber housing. Providing the shuttle engagement member above the sealing surface of the cleaning chamber housing allows the cleaning chamber housing to be suspended underneath the nozzle arrangement whilst providing the shuttle track above the nozzle arrangement and concealed within a housing of the apparatus. The shuttle engagement member may be provided on a distal end of an arm which extends upwardly from the cleaning chamber housing or an upper surface thereof.

The shuttle engagement member may be provided at first end of the cleaning chamber housing and the drive arm may be drivably connected to a second end of the cleaning chamber housing. The first end may be in front of the nozzle arrangement when in the deployed position and to the rear of the nozzle arrangement when in the stowed position. The second end may be to the rear of the nozzle arrangement in the stowed and deployed positions.

The cleaning chamber housing may be rotatably urged against the nozzle arrangement. The drivable connection may be lifted by the drive arm to pivot the cleaning chamber housing about the shuttle engagement member.

The apparatus may further comprise one or more drink preparation modules. The drink preparation modules may comprise a coffee module configured to prepare (e.g. brew) coffee, a mixing module configured to prepare a mixed fluid from a mixing fluid (e.g. milk, water, etc) and a dry edible powder (e.g. chocolate, soup, sweetener, etc). The cleaning chamber housing may form part of a cleaning circuit in which cleaning fluid is circulated through the one or more drink preparation modules and the cleaning chamber housing. The apparatus may further comprise a hot water module configured to heat a supply of water for circulating around the cleaning circuit.

The cleaning circuit may be a closed circuit and/or an open circuit which terminates in at external drain. The external drain may be connected to the cleaning chamber.

The cleaning circuit may comprise a plurality of drink preparation modules. The cleaning circuit may be configured to connect the water heater module and the cleaning module in a closed circuit such that a cleaning fluid can be prepared. The cleaning circuit may be configured to comprise the cleaning module and one or more of the drink preparation modules. The cleaning circuit may comprise the cleaning chamber. The cleaning chamber may be connected to each of the drink preparation modules via at least one of the outlet nozzles. The cleaning chamber may be connected to the cleaning module via the cleaning return nozzle.

According to the present disclosure, there is provided a method of cleaning a drink dispensing apparatus. The drink dispensing apparatus may be any drink dispensing apparatus disclosed herein.

The method may comprise: sealably engaging the nozzle arrangement and cleaning chamber housing to provide a cleaning chamber around the plurality of nozzles; circulating a cleaning fluid through the cleaning chamber. The circulating of cleaning fluid through the cleaning chamber may comprise providing an inflow of cleaning fluid from one or more of the plurality of nozzles and extracting the cleaning fluid using the cleaning return nozzle. The cleaning return nozzle may be configured to suck the cleaning fluid from the cleaning chamber. The cleaning return nozzle may be in fluid connection with a pump. The pump may be provided by the cleaning module.

When the drink dispensing apparatus comprises a drink preparation module the method may further comprise circulating the cleaning fluid through the drink preparation module to an external drain or the cleaning module. The method may further comprise carrying out one or more of a residual flushing phase in which hot or cold water is circulated through one or more of the drink preparation modules to the external drain via the cleaning chamber; a sanitising phase in which a cleaning fluid is circulated through the one or more the drink preparation modules and the cleaning module in a closed loop including the cleaning chamber, prior to being connected to the external drain via the cleaning chamber; and a cleaning fluid flushing phase in which water is flushed through one or more of the drink preparation modules to the external drain via the cleaning chamber. The method may further comprise purging residual fluid from the cleaning chamber using an air or fluid flow.

The apparatus may heat the cleaning fluid to a temperature of at least 50° C., preferably at least 60° C., preferably at least 70° C., and most preferably approximately 75° C.

The apparatus may circulate the cleaning fluid through all sub-systems at the elevated temperature, for a selected time period, for example, at least 2 minutes, preferably at least 3 minutes, preferably at least 4 minutes, and more preferably at least 5 minutes.

The cleaning fluid may then be drained from the dispensable fluid circuit. Preferably, all subsystems may then flushed to remove any remaining cleaning fluid. The outlet dock may then be opened to return the apparatus to the dispensing mode.

The apparatus may be used in an intermediate rinse mode in which the outlet dock may be closed to isolate the source of dispensable fluid, so that the apparatus can go into an intermediate rinse mode. Preferably, all sub-systems may then be flushed to remove any dispensable fluid remains from the dispensable fluid circuit. After this, the outlet dock may then be opened to return the apparatus to the dispensing mode.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION OF THE INVENTION

Throughout the following description, references to fore, forwards and front may be taken with reference to the front of the drink dispensing apparatus which faces a user and receives the drink receptacle. References to aft, rearwards and rear can be taken to be behind the nozzle arrangement with regard to the user of the drink dispensing apparatus. References to axial may relate to an axis which extends between the front and rear of the nozzle arrangement. References to upper and lower/underneath should be taken with regard to the in use orientation.

Figure 1:
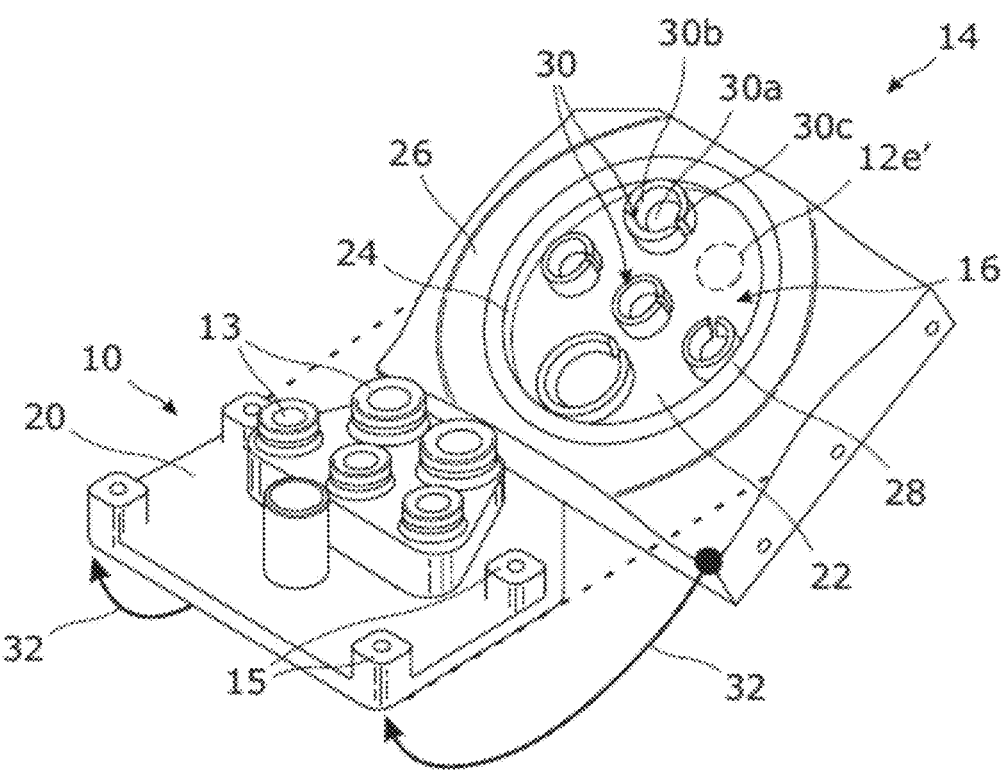
FIG. 1 shows a nozzle arrangement and cleaning chamber housing according to the present invention.
Figure 2:
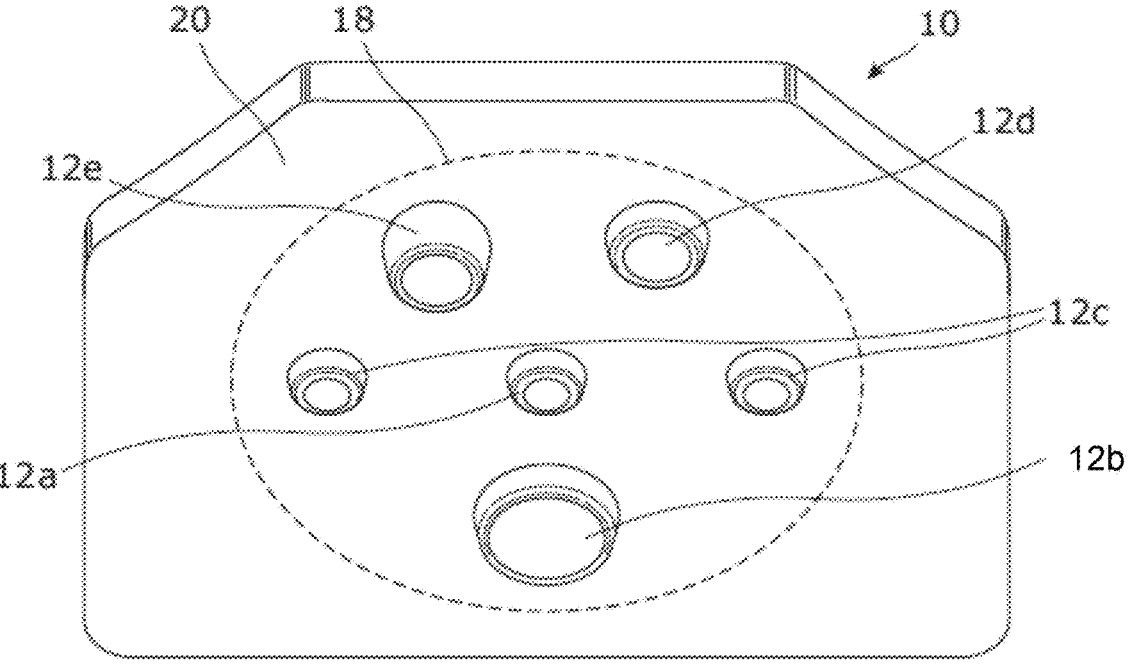
FIG. 2 shows an underside of the nozzle arrangement shown in FIG. 1 from where a drinkable fluid is dispensed.

FIGS. 1 and 2 shows a nozzle arrangement 10 comprising a plurality of nozzles 12a-12e. At least one of the nozzles 12a may be a drink output nozzle. At least one of the nozzles may be a cleaning return nozzle 12e. A cleaning chamber housing 14 which is repeatedly movable between a deployed, cleaning position and a stowed position is also shown in FIG. 1. FIG. 1 shows the cleaning chamber housing 14 behind the nozzle arrangement 10 in a stowed position without the surrounding structure of the drink dispensing apparatus and drive mechanism for the sake of clarity. The housing and drive mechanism are described in relation to FIGS. 3a and 3b and 4a to 4h. An example of a drink dispensing apparatus which may incorporate the cleaning chamber housing 14 and nozzle arrangement 10 is shown in FIG. 5 and described further below.

The cleaning chamber housing 14 may comprise an internal cavity 16 into which the plurality of nozzles 12a-12e are sealably received when the cleaning chamber housing 14 is in the deployed position. As such, the cleaning chamber housing 14 and nozzle arrangement 10 cooperate to form a cleaning chamber when the nozzles 12a-12e are sealably received within the internal cavity 16. The cleaning chamber is such that it includes all of the plurality of nozzles 12a-12e within the same sealed volume so as that the nozzles 12a-12d are in fluid communication with the internal cavity 16 and the at least one cleaning return nozzle 12e. Providing the outlet nozzles 12a-12e within the same cleaning chamber allows cleaning fluid to be collected within a common zone and removed therefrom using a cleaning return nozzle 12e.

The cleaning return nozzle 12e may be used to pump cleaning fluid out of the cleaning chamber. Using a pump may allow for an increased flow of cleaning fluid along the interior and exterior surfaces of the outlet nozzles 12a-12d and may allow the cleaning of the outlet nozzles 12a-12d to form part of a cleaning fluid circuit. The cleaning fluid may be pumped into the cleaning chamber via the outlet nozzles 12a-12d, either collectively or individually, and pumped out using the cleaning return nozzle 12e. The cleaning fluid circuit may comprise a plurality of components within the drink dispensing apparatus and allow cleaning fluid to be circulated through the plurality of components prior to being ejected to an external drain.

A further advantage of providing a single cleaning chamber allows the surrounding area of the nozzle arrangement 10 from which the nozzles 12a-12e extend to be cleaned. This area may become contaminated with dispensed fluid which has splashed back up towards the nozzles 12a-12e.

Providing a cleaning return nozzle provides a convenient and space efficient manner of removing cleaning fluid from the cleaning fluid chamber. As such, no drainage channels or drainpipe are required to be provided as part of the cleaning chamber housing.

FIG. 2 shows the underside of the nozzle arrangement 10 revealing the outwardly facing external side of the nozzle arrangement from which the plurality of nozzles 12a-12e extend. The external side is arranged to sit above a receptacle such that the drinkable fluid can be dispensed to a receptacle below. The external side may also provide a seal surface 18 against which the cleaning chamber housing 14 is urged to define the cleaning chamber. The seal surface 18 encircles the plurality of nozzles such that they can be housed within the same sealed chamber. As can be seen from FIG. 1, the backside of the nozzles 12a-12e may comprise various connection features 13 which to which fluid delivery pipes are connected in use. Hence, fluid dispensed from the nozzles 12a-12d enters the backside of the nozzle arrangement 10 shown in FIG. 1 and exits the nozzle arrangement from the side shown in FIG. 2.

The nozzle arrangement 10 may comprise a nozzle arrangement body 20 from which the plurality of nozzles 12a-12e extend. As shown in FIGS. 1 and 2, there may be a plurality of outlet nozzles 12a-12d and a single cleaning return nozzle 12e, although other configurations are possible and there may be a single outlet nozzle 12a and a single or multiple cleaning return nozzles 12e in some embodiments. The nozzles 12a-12e shown in FIGS. 1 and 2 may include a water outlet nozzle 12b, coffee outlet nozzles 12c, a chocolate outlet nozzle 12d, a milk nozzle 12a and a cleaning return nozzle 12e, for example. In other embodiments, the nozzles may comprise any consumable fluid and may comprise any one or more of coffee, chocolate, soup, tea, soft drinks or water outlet nozzles, amongst others. The nozzles 12a-12e may extend out of the plane of the external surface of the nozzle arrangement 10. The external surface may be planar. The nozzle arrangement body 20 may comprise one or more attachment features 15 for attaching the nozzle arrangement to the drink dispensing apparatus.

The cleaning return nozzle 12e may be configured to extend into the internal cavity 16 of the cleaning chamber housing 14 such that cleaning fluid which has been introduced into the internal cavity 16 can be drawn up and removed by the cleaning return nozzle 12e. As such, the cleaning return nozzle 12e may extend into the internal cavity 16 and terminate at the lowest point of the internal cavity 16 or be proximate to a base 22 of the cleaning chamber housing 14. In the embodiment shown, the area of the cleaning chamber housing 14 into which the cleaning return nozzle 12e extends comprises a planar base 22 but it will be appreciated that the cleaning chamber housing 14 may comprise one or more indentation or other form of hollow so as to provide a sump into which the cleaning fluid can collect and the cleaning return nozzle 12e can be received in use.

In some embodiments, the base 22 of the cleaning chamber housing 14 may be arranged to be horizontal when in the deployed position or may be inclined towards the location of the cleaning return nozzle 12e such that the cleaning fluid falls towards the cleaning return nozzle 12e to provide for improved extraction of the cleaning fluid. The inclination of the base 22 may be provided by a general orientation of the cleaning chamber housing 14 when in the deployed position, or by the base 22 being inclined relative to the upper surface which abuts the nozzle arrangement sealing surface 18. The inclination of the base 22 may be in a single plane or may be towards a single point such that the flow line between each output nozzle is graded towards the cleaning return nozzle 12e. The area 12e' of the cleaning chamber housing 14 which opposes the cleaning return nozzle 12e may be referred to as a sump area. Providing the cleaning return nozzle 12e in a sump area allows the cleaning fluid to be removed from the internal cavity 16 to a level which is below the terminal ends of the drink outlet nozzles 12a-12d.

As noted above, the nozzle arrangement 10 may comprise a nozzle arrangement body 20 from which the nozzles 12a-12e extend. In the embodiment shown, the nozzle arrangement body 20 comprises a plate-like structure with the nozzles 12a-12e extending from a substantially planar external underside thereof but this is not a limitation and other forms are possible within the bounds of the present disclosure. For example, the nozzle arrangement 10 may comprise a seal element or other feature to provide an improved seal surface 18 against which the cleaning chamber housing 14 can be urged.

The nozzles 12a-12e are generally cylindrical having a central axis which extends perpendicularly from the surface of the nozzle arrangement body 20. The diameter of the nozzles 12a-12e may vary with application and the type of nozzle.

When in the cleaning configuration, the nozzles 12a-12e extend towards the cleaning chamber housing base 22 and may have a length which determines the separation from the base 22 thereof. As noted above, the cleaning return nozzle 12e may be placed closest to the base 22 and may be the longest nozzle of the plurality of nozzles 12a-12e. The length of the nozzles 12a-12e may be measured from the external surface nozzle arrangement body 20.

The cleaning chamber housing 14 comprises a plate-like structure having a hollow in one side thereof defining the internal cavity 16 in which the plurality of nozzles 12a-12e are received. The internal cavity 16 comprises base 22 and at least one peripheral side wall 24. The upper end of the internal cavity 16 which faces and receives the nozzles 12a-12e is generally open. Thus, in use, the base 22 is provided on an underside of the nozzle arrangement 10 to provide a tray for receiving the cleaning fluid and directing to the cleaning return nozzle 12e. The external surface of the base (which is obscured from view) provides an external surface of the nozzle arrangement 10 when in a deployed position and during a cleaning procedure.

The peripheral side wall 24 of the internal cavity 16 is generally circular so as to define a round cavity in which to receive the outlet nozzles 12a-12e but other shapes may be used in some embodiments.

The distal end of the side wall 24 terminates at an upper surface 26 of the cleaning housing chamber 14 which faces the nozzle arrangement 10 in the deployed position. The upper surface 26 may define a sealing surface which is urged against the nozzle arrangement sealing surface 18 in order to define and seal the cleaning chamber. The sealing surface 26 may include a seal element 28 such as a gasket or O-ring to aid the sealing. The seal element 28 may provided on the cleaning chamber housing upper surface 26 and/or the nozzle arrangement 10. Providing seal element 28 on the cleaning chamber housing 14 may be preferential in some embodiments as it allows the opposing surface of the nozzle arrangement 10 to be planar and smooth. Having a planar and smooth wall surrounding the nozzles 12a-12e on the nozzle arrangement 10 may be considered preferable from a hygiene and aesthetic point of view.

The position of the seal element 28 may be at the terminal edge of the side wall 24 so as to limit the extent of the sealed chamber to the internal cavity 16. However, the seal may be placed at other locations in other embodiments.

The internal cavity 16 of the cleaning chamber may be generally smooth walled and with a planar base 22 and uniformly circumferentially curved sidewalls. As such, the internal cavity 16 may house the nozzles with a common volume. However, as can be seen from the embodiment shown in FIG. 1, the cleaning chamber housing 14 may comprise one or more features to aid cleaning of the plurality of nozzles, the outlet nozzles 12a-12d.

FIG. 1 shows a plurality of internal wells 30 in which the nozzles 12a-12d can be individually received. The area where there is no well, as indicated by the dashed circle 12e' reflects the location of the cleaning return nozzle 12e. The wells 30 may take the form of a bowl which defines a well cavity (which may be referred to as a cleaning cavity) which is dimensioned to loosely receive a respective outlet nozzle therein. The wells 30 each comprise a base 30a and a sidewall 30b which extends upwardly from the well base 30a to define the nozzle receiving recess/bowl of the well 30. The nozzles 12a-12d are received within a respective well 30 such that there is a separation between the base 30a and sidewall 30b around the external surfaces of the nozzle at the terminal end thereof.

The separation of between the nozzle 12a-12d and the opposing surface of the well 30 provided by the base 30a or sidewall 30b may be suitably sized to provide a fluid pathway for a flow of cleaning fluid around the exterior of the nozzle 12a-12d. The separation between the nozzle 12a-12d and sidewall 30b of the well may be uniform around the full circumference of the nozzles 12a-12d, thereby helping to provide a substantially uniform flow of cleaning fluid in use.

As a cleaning fluid is introduced into the well 30 from the outlet nozzle 12a-12d, it passes along the internal surfaces of the nozzle 12a-12d before being turned by the base 30a of the well and direct outwardly along the outer surface of the nozzles 12a-12d by the sidewalls 30b. As shown, the wells 30 may be open ended such that the fluid can flow freely over a top edge of a sidewall of the well 30 and into the volume of the internal cavity 16, and sump 12*e*' for extraction by the common cleaning return nozzle 12*e*.

Each well 30 may be elevated from the cleaning chamber housing base 22 and be formed on or as part of an upstand/pedestal which extends from the base 22. Each base 30*a* may be at the same height or in an elevated position with respect to the cleaning chamber housing base 22 and each base 30*a* may be a different height to the other bases, and sidewall 30*b*. It will be appreciated from the above, that the nozzles 12*a*-12*d* may be concentrically arranged above the wells 30.

To prevent the wells 30 trapping cleaning fluid, each well 30 may be provided with a drainage aperture 30*c* such that water may flow into the internal cavity 16 of the cleaning chamber which acts as a sump for the cleaning return nozzle 12*e*. The drainage aperture 30*c* may be any suitable orifice in the side wall 30*b*, or base 30*a*, of the well 30 and may be suitably sized to prevent an excessive amount of cleaning fluid draining from the well during a cleaning operation, thereby ensuring a suitable flow around the external surface of the nozzles 12*a*-12*d*. In the embodiment shown in FIG. 1, the side walls 30*b* are provided with notches which extend from the distal end of the side wall 30*b* to the base 30*c*. The notches may be provided in any circumferential location around the side wall 30*b* or base 30*a* but, as can be seen, may be provided proximal to the cleaning return nozzle 12*e* such that the remanence of the cleaning fluid drains with a general trajectory in the direction of the cleaning return nozzle to aid with a timely extraction of the fluid.

The movement of the cleaning chamber housing 14 is generally indicated by the arrows 32 shown in FIG. 1. Thus, the cleaning chamber housing 14 is moved forward from behind the nozzle arrangement 10 to underneath the nozzle arrangement 10, prior to being urged upwards to seal against the underside of the nozzle arrangement to provide the sealed cleaning chamber.

The orientation of the cleaning chamber housing 14 may change whilst moving between the stowed to the deployed positions but may remain facing generally upwards and/or towards the nozzle arrangement 10 in preferred embodiments.

Figure 3A:
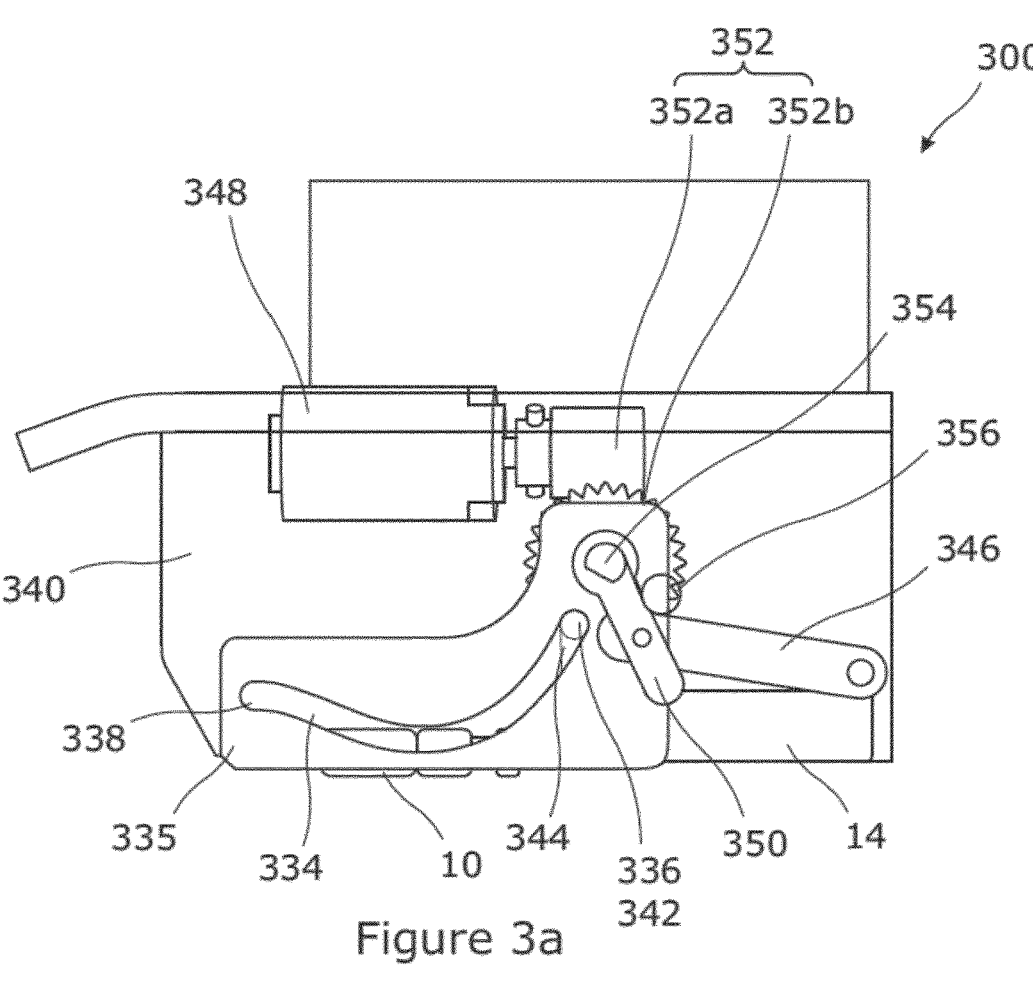
FIGS. 3a and 3b show side views of a drive mechanism which may be utilised to move the cleaning chamber housing between a stowed position (FIG. 3a) and a deployed position (FIG. 3b)
Figure 3B:
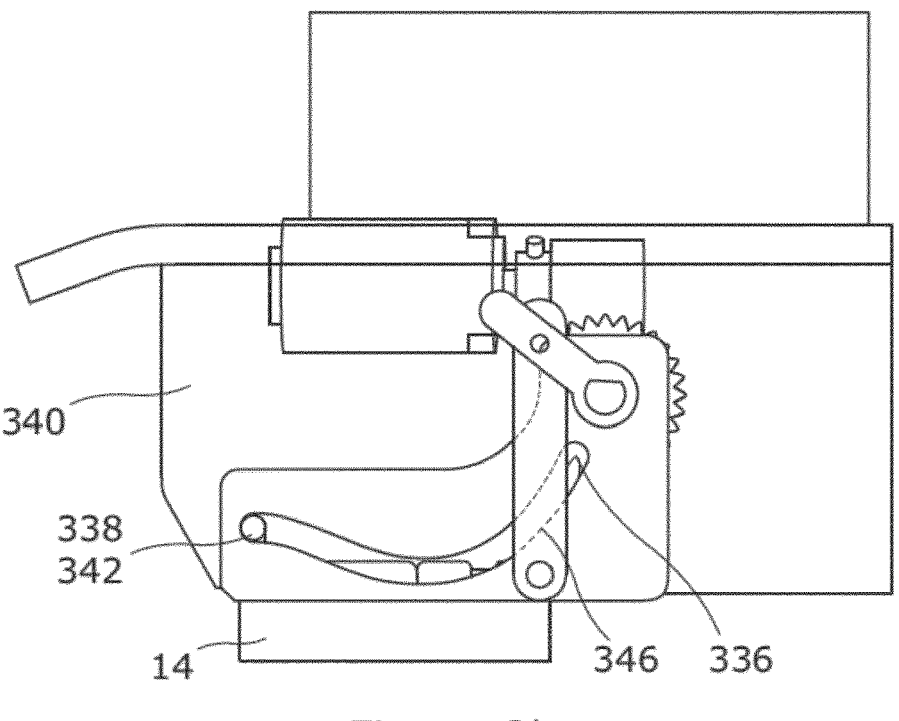

In order to move the cleaning chamber housing 14 from the stowed position to the deployed position and back, the drink dispensing apparatus may comprise a drive mechanism. An example of a drive mechanism 300 is shown in FIGS. 3*a* and 3*b* in which the cleaning chamber housing 14 is in stowed and deployed positions respectively.

The drive mechanism 300 may include a linear drive having a shuttle track 334 along which the cleaning chamber housing 14 is urged and, in some embodiments, pivoted. The shuttle track 334 may be provided by any suitable track along which the cleaning chamber housing 14 can be guided. The shuttle track 334 may be a rail, slot, channel, groove or any other suitable type of projection, recess or aperture. The shuttle track 334 shown in FIGS. 3*a* and 3*b* comprises an elongate slot in a wall 335 or other suitable structure which flanks the side of the nozzle arrangement 10. The wall 335 may be a wall of a nozzle arrangement housing 340 in which the nozzle arrangement 10 is provided.

The nozzle arrangement housing 340 may comprise an enclosure or portion of the drink dispensing apparatus in which the nozzle arrangement 10, cleaning chamber housing 14 and/or drive mechanism 300 are provided. The nozzle arrangement housing 340 may comprise one or more walls and suitable features for mounting the nozzle arrangement 10, drive mechanism 300 and cleaning chamber housing 14.

The shuttle track 334 may be configured to slidably receive one or more shuttle engagement members 342 which are attached to the cleaning chamber housing 14. It will be appreciated that the form of the shuttle engagement member 342 will be dependent on the form of shuttle track 334. In embodiments where the shuttle track 334 is a slot, as shown in FIGS. 3*a* and 3*b*, the shuttle engagement member 342 may be a projection, e.g. a pin, which is received within the slot. The engagement member 342 may be configured to be slidable along the length of the shuttle track 334 and rotatable. As such, the shuttle engagement member 342 may define an axis of rotation about which the cleaning chamber 14 housing can rotate/pivot.

An advantage of using a shuttle engagement member 342 which is slidably and rotatably engaged within a track 334 is that it can allow for the axial transition of the cleaning chamber housing 14 and a pivoting action with regards to the nozzle arrangement 10. Hence, as the cleaning chamber housing 14 traverses the length of the shuttle track 334, it may change angular orientation. This may allow the cleaning chamber housing 14 to be pivoted away from the nozzle arrangement 10 to allow movement of the cleaning chamber housing 14 to below the nozzle arrangement 10, and also allow the urging together of the cleaning chamber housing 14 and nozzle arrangement 10 by a pivoting action. In addition, a sliding pivot arrangement means that the cleaning chamber housing 16 can be moved using a simple actuator arrangement, such as the one described herein, which can reduce the complexity of the drive used to deploy the cleaning chamber housing 16. A further advantage of this arrangement is that, by shaping the shuttle track correctly, the clearance required for moving the cleaning chamber housing from the stowed to the deployed position can be minimised. Hence, the risk of the cleaning chamber housing colliding with a drink receptacle left below the outlet nozzles when moving between the stowed and deployed positions is reduced.

Although not shown in the drawings, there may be a plurality of shuttle tracks 334, and drive mechanisms, one on either side of the nozzle arrangement 10 such that the cleaning chamber housing 14 may be supported on either side. Providing support on either side of the nozzle arrangement 10 may allow for a smoother transition of the cleaning chamber housing 14 between the stowed and deployed positions and may allow for an improved more uniform seal between the cleaning chamber housing 14 and nozzle arrangement 10.

The shuttle engagement member 342 may be provided at any suitable location on the cleaning chamber housing 14. In the embodiment shown, the shuttle engagement member 342 is provided towards the front of the cleaning chamber housing 14. Providing the shuttle engagement members 342 towards the front of the cleaning chamber housing 14 and a drive link 346, which is actuated to move the cleaning chamber housing 14, towards or at the rear makes use of the available length of the cleaning chamber housing 14 to lever it into place, thereby reducing the driving force required to make a seal.

The shuttle engagement members 342 may be provided above the plane of the cleaning chamber housing base 22. In order to achieve this, the shuttle engagement member 342 may be provided on distal ends of arms 344 which extend upwardly from the upper surface of the cleaning chamber housing 14. The use of the arm 344 allow the corresponding shuttle track 334 to be located above the lower surface of the nozzle arrangement 10 thereby concealing it within the nozzle arrangement housing 340 of the drink dispensing apparatus. The shuttle engagement members 342 may extend outwardly from the arms 344 along the axis of rotation of the cleaning chamber housing 14. The arms 344 may be seen more clearly in FIGS. 4c and 4d.

It will be appreciated that the position of the shuttle engagement member 342 and the drive link 346 may be reversed such that the drive link 346 is attached at the front of the cleaning chamber housing 14 and the shuttle engagement member 342 is provided at the rear in some embodiments.

The separation of the shuttle engagement member 342 and the sealing surface 26 of the cleaning chamber housing 14 may correspond to the vertical distance between the second end 338 of the shuttle track 334 and the sealing surface 18 of the nozzle arrangement 10. Hence, when the shuttle engagement member 342 is in the second end 338 of the shuttle track 334, the cleaning channel housing 14 may be urged against the sealing surface of the nozzle arrangement 10.

As shown, the shuttle track 334 may extend from aft of the nozzle arrangement 10 to fore of the nozzle arrangement 10 such that axial movement of cleaning chamber housing 14 is from a rearward stowed position to a forward deployed position. The shuttle track 334 may follow a circuitous path between a first end 336 which represents a start point and a second end 338 which represents an end point. The start point may relate to the stowed position with the end point being a deployed position.

The circuitous path may be a curved path such that the elevation of the shuttle engagement member 342 and orientation of the cleaning chamber housing 14 relative to the nozzle arrangement 10 can be altered as the cleaning chamber housing 14 travels along the length of the shuttle track 334. The first end 336 of the shuttle track 334 may be above the second end 338 and nozzle arrangement 10 such that the cleaning chamber housing 14 may be located above and behind the nozzle arrangement 10 the sealing surface 18 and/or nozzles 12a-12e and fully concealed when in the stowed position.

In the embodiment shown in FIGS. 3a and 3b, the shuttle track 334 extends forwards and downwards from the first end 336 towards a minima which is located generally at an approximate mid-point of the length of the track 334, before turning upwards towards the second end. The shuttle track 334 is shown as continuously curving from the first end 336 to the second end 338 where the direction of curvature changes at an inflection local to the second end 338 to terminate in a short horizontal portion in which the shuttle engagement member 342 is parked in the deployed position. It will be appreciated that, although the track 334 is shown as continuously curving there may be one or more straight portions and the horizontal terminal end is optional. The shuttle track 334 may generally be described as a shallow u-shape. It will be appreciated that the exact form of the shuttle track 334 shape may differ in other embodiments. For example, the relative heights of the first 336 and second 338 ends may be similar or the second end 338 may be higher. Further, the mid-point of the curvature may be shifted towards the first 336 or second 338 ends. Further still, the track 334 may not continuously curve and may comprise one or more straight portions.

The first portion of the shuttle track 334 which extends from the first end 336 towards the lowest part comprises a generally downwards trajectory and causes the cleaning chamber housing 14 to move downwards to a position where it can be moved forwards underneath the nozzle arrangement 10 to the lowest point. From here, movement of the cleaning chamber housing 14 further forward causes the front end to rise relative to the nozzle arrangement 10 and rear of the cleaning chamber housing 14 towards the end of the track 334. From here, as described further below, rotating the cleaning chamber housing 14 about pivot of the shuttle engagement member 342 further acts to lift the rear of the cleaning chamber housing 14 such that sealing contact is made between the cleaning chamber housing 14 and the nozzle arrangement 10.

The drive mechanism may comprise an actuator 348 which is configured to move the cleaning chamber housing 14 from the stowed position to the deployed position in a reciprocating manner. The actuator 348 may be a linear or rotary drive as are well known in the art. The drive mechanism may be electrically operated and may include one or more electrical motors 348, for example, a stepper motor.

The drive mechanism 300 may further comprise a crank in which the rotation of a rotor causes the linear motion of the cleaning chamber housing 14 via a drive link 346 (which may be referred to as a push rod). The drive link 346 may extend between a drive arm 350 of the rotor and the cleaning chamber housing 14 and may be rotatably/pivotably connected at either end to allow relative rotation with respect to the rotor and the cleaning chamber housing 14.

In the embodiment shown, the electrical motor 348 engages with and rotates the rotor drive arm 350. The rotor drive arm 350 may be connected directly to the shaft of the electrical motor 348 or may be connected via one or more gears. In the embodiment shown, the electrical motor 348 drives the drive arm 350 via a worm drive 352. The worm drive 352 may comprise a worm screw 352a and a worm gear 352b and may be configured to rotate drive arms 350 on either side of the cleaning chamber housing 14. As such, the drive mechanism 300 may comprise a single motor to simultaneously drive both sides of the cleaning chamber housing 14.

The drive arm 350 is coupled to a shaft 354 of the worm gear 352b via a suitable attachment, e.g. a spline, such that rotation of the shaft 354 causes a rotation of the drive arm 350. A distal portion of the drive arm 350 is attached to a drive link 346 via a pivot such that the drive link 346 and drive arm 350 can rotate relative to one another. A distal end of the drive link 346 is attached to the cleaning chamber housing 14 via a further pivot such that the drive link 346 and cleaning housing chamber 14 can rotate relative to each other. An opposing end of the cleaning chamber housing 14 comprises the shuttle engagement member 342 which extends into the shuttle track 334. The engagement between the shuttle track 334 and shuttle engagement member 342 allows the sliding fore and aft of the cleaning chamber housing 14, and the pivoting of the cleaning chamber housing 14 relative to the shuttle track 334.

Also included in the arrangement is a tensioning member 356 in the form of a spring which urges the drive arm 350 and drive link 346 apart from one another thereby urging the cleaning chamber housing 14 forwards when in the deployed position and/or lifting the cleaning chamber housing 14 when in the stowed position.

The lengths and positions of the drive shaft 354, drive arm 350, drive link 346, connection points on the cleaning chamber housing 14 and the angle through which the drive arm travels may be varied in accordance with particular embodiments and the desired path of travel for the cleaning chamber housing 14. In some embodiments, the cleaning chamber housing 14 may be stowed in a position which is generally aligned with the initial fall of the shuttle track 334 so that the cleaning chamber housing 14 may be moved along the track 334 more readily when urged forwards. The angle between the plane of the cleaning chamber housing 14 to the horizontal may be between 0 degrees and 90 degrees, optionally between 40 degrees and 50 degrees, optionally 45 degrees. When in the deployed position, the drive link 346 may be in a substantially vertical orientation such that the cleaning chamber housing 14 might be urged more readily onto the nozzle arrangement 10.

The angular extent through which the drive arm 350 travels may be between 180 degrees and 90 degrees.

Figures 4A, 4B, 4C, 4D, 4E, 4F, 4G, 4H:
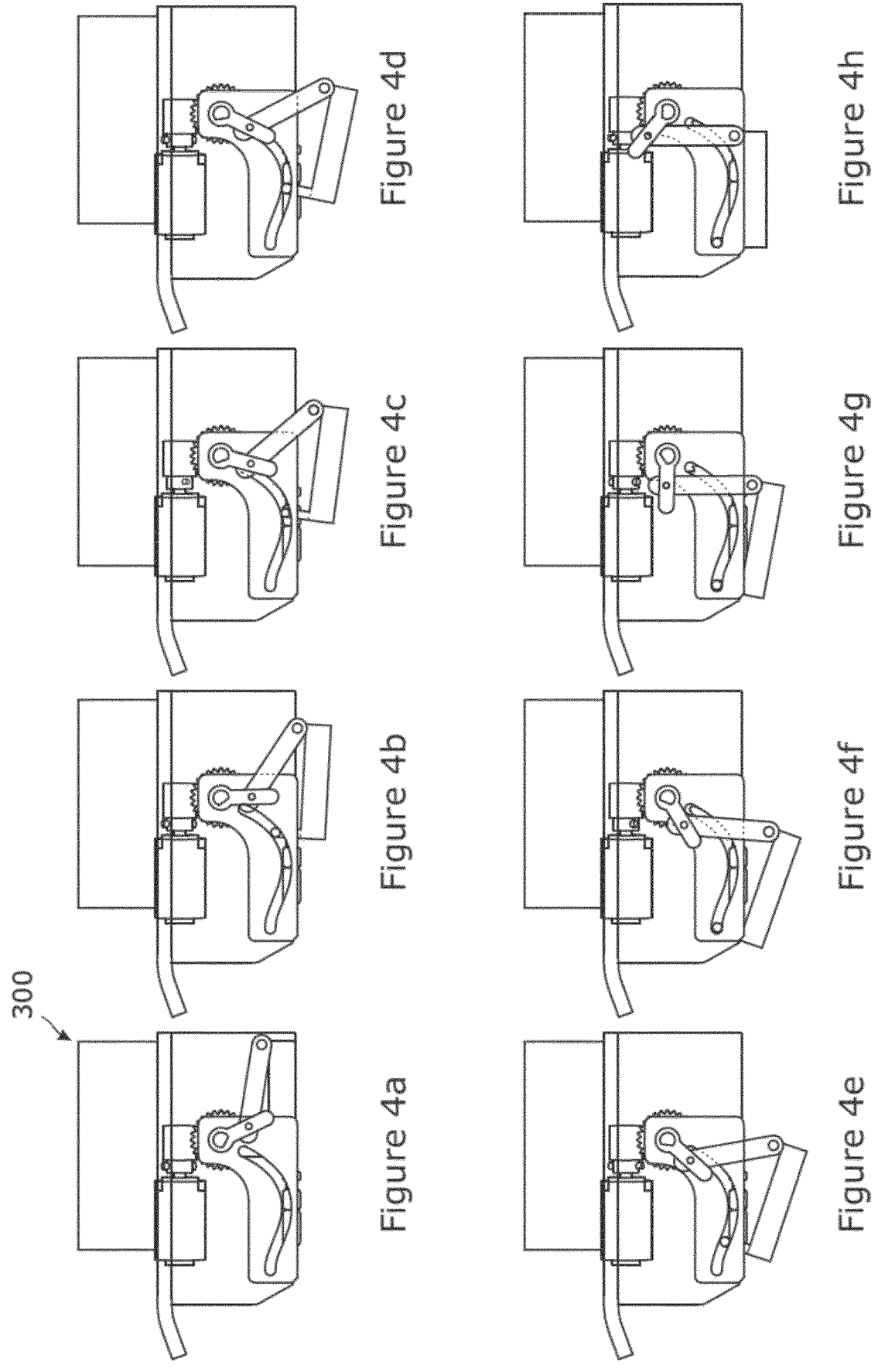
FIGS. 4a to 4h shows the drive mechanism of FIGS. 3a and 3b at various stages; and, FIG. 5 shows a schematic representation of a drink dispensing apparatus which incorporates the nozzle arrangement and cleaning chamber housing of the present disclosure.
Figure 5:
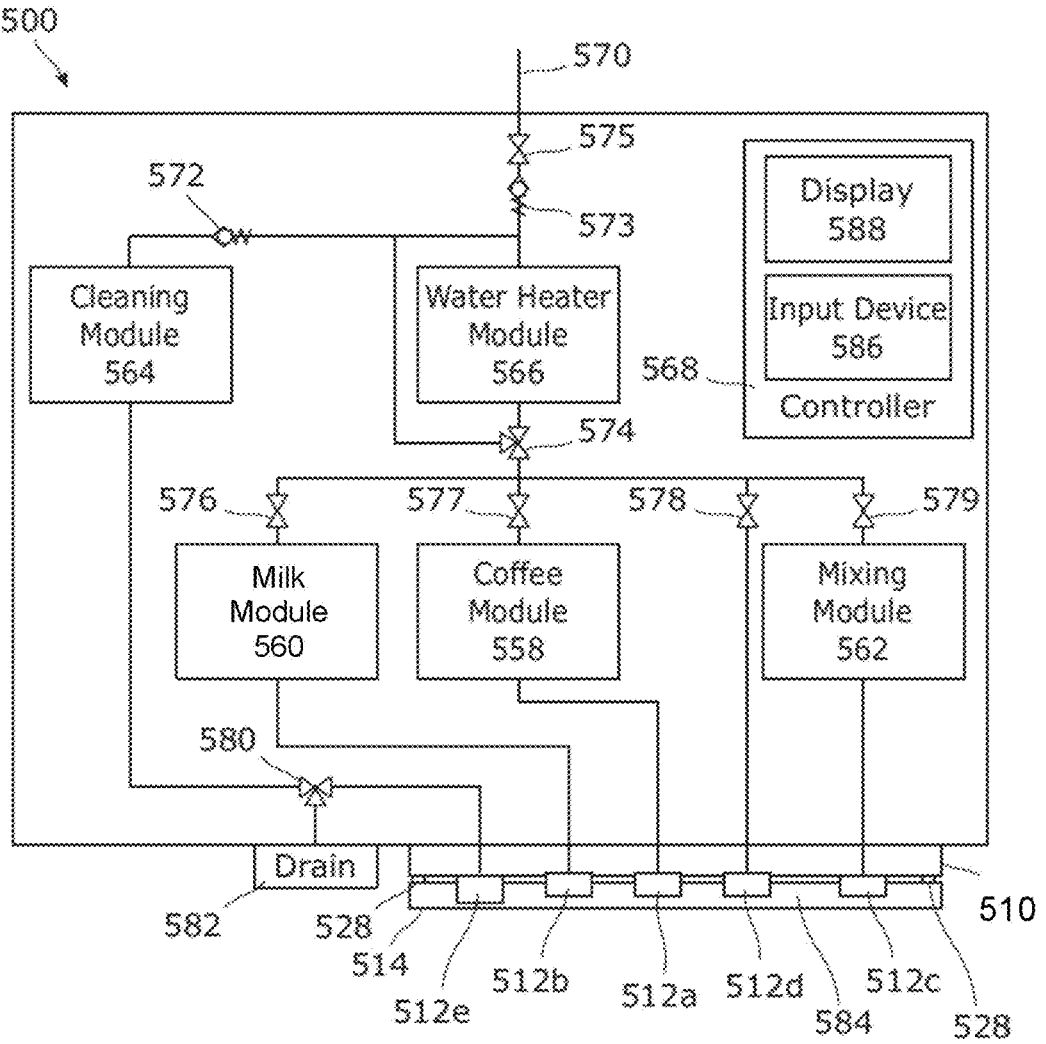

FIGS. 4a to 4h show the progressive movements of the cleaning chamber housing 14 and drive mechanism 300 at various stages of deployment. Although reference numerals are not included in these drawings, it will be appreciated that the features coincide with those of FIGS. 3a and 3b. More specifically, FIG. 4a shows the cleaning chamber housing 14 in the stowed position and is the same as FIG. 3a, FIG. 4b shows an initial drop phase of the movement in which the rotation of the drive arm results in the dropping of the cleaning chamber housing 14 out of the nozzle arrangement 10 housing, FIGS. 4c to 4e show the continued rotation of the drive arm and transition of the shuttle engagement member along the shuttle track; FIG. 4f shows the shuttle engagement member reaching the terminal end of the shuttle track; FIG. 4g shows the continued rotation of the drive arm to which results in the lifting of the rear end of the cleaning chamber housing, and FIG. 4h shows the end of the rotation phase of the drive arm in which the cleaning chamber housing 14 and nozzle arrangement 10 are sealably urged together such that a cleaning process may be carried out. As drive mechanism 300 of FIGS. 4a to 4h corresponds to that shown in FIGS. 3a and 3b the reference numerals are not repeated to avoid obscuring the drawings.

Once the cleaning process has been executed, the steps shown in FIGS. 4a to 4h may be reversed so as to move the cleaning chamber housing 14 from the deployed position to the stowed position.

It will be appreciated that any fluid left in the cleaning chamber housing 14 following the cleaning process may be left to evaporate.

FIG. 5 shows a drink dispensing apparatus 500 in the form of a coffee machine. The reference numerals 5XX, correspond to reference numerals XX and 3XX used previously. The coffee machine 500 comprises an outlet nozzle arrangement 510 and a cleaning chamber housing 514 according to the present disclosure. Although not shown, the nozzle arrangement 510 will be located above a drink receptacle in use. The drink receptacle may be provided on a drip tray.

As shown, the drink dispensing apparatus 500 may comprise one or more drink preparation modules such as coffee module 558 which is configured to receive a dry coffee powder and brew a coffee for dispensing from one of the outlet nozzles 12a-12d; a milk module 560 which may be configured to provide heated and/or frothed milk for dispensing from one of the outlet nozzles 12a-12d; a mixing module 562 for mixing a dry powder with a fluid, e.g. chocolate powder with water, for dispensing to another of the outlet nozzles 12a-12d; a cleaning module 564 which is configured to provide a cleaning agent for cleaning the various modules, and a water heater module 566 configured to heat water. It will be appreciated that the various modules 558 to 566 described herein are exemplary and various embodiments may comprise fewer or more modules and the modules may be different from those described. For example, the drink dispensing apparatus may be or include a facility to make soup or other edible products or may be a tea making machine. Other examples may be known to the skilled person from the art. Further, the modules 558 to 566 in themselves may be considered to be conventional in many ways and so the internal workings are not described in detail.

The modules 558 to 566 of the drink dispensing machine 500 may each be connected to the outlet nozzle arrangement 510 which comprises a plurality of outlet nozzles 512a to 512d as disclosed above. Thus, the coffee brewer 558 is connected to a first outlet nozzle 512a, the milk module 560 is connected to a second outlet nozzle 512b, the mixing module 562 is connected to a third outlet nozzle 512c, and the water supply 570 is connected to a fourth outlet nozzle 512d, either directly or via the water heater module 566. Each of the water heater module 566, milk module 560, coffee module 558 and mixing module 562 are all configured to receive water from either the water supply directly or indirectly, and the cleaning module 564. The cleaning module 564 is additionally connected to an external drain 582 and the cleaning return nozzle 512e. The cleaning return nozzle 512e is connected to the external drain 582. It will be appreciated that the external drain 580 may be connected to a mains drain in the premises where the apparatus 500 is located, or to a suitable receptacle for the temporary storage of the waste.

The interconnections of the various modules 558 to 566 and external drain 582 is achieved with suitable pipework and valves 574 to 580 which are selectively operable under the control of the controller 568 to connect the various modules 558 to 566 and nozzles 12a-12e in accordance with a desired configuration. The valves may be any suitable valves known in the art and may include one-way valves 572, 573, isolation valves 575 to 579, three-way valves 574, 580, etc. The valves 574 to 580 may be controlled via a controller 568 in accordance with a predetermined schedule of operation required for the preparation of a drink and cleaning.

Water inlet 570 provides pressurised water to the drink dispensing apparatus 500 as known in the art. Although not shown, it will be appreciated that the drink dispensing apparatus 500 or modules thereof may comprise one or more pumps for pumping the various fluids between modules and the outlet nozzles 512a-512e.

The presence of the cleaning chamber housing 514 enables the creation of a fluid circuit between each of the modules 558 to 566 and the drain 582, and each of the drink preparation modules 558 to 562 and cleaning module 564. The presence of the cleaning chamber housing 514 therefore provides a convenient way to pass cleaning fluid (e.g. cold or hot water, steam or a cleaning fluid containing a cleaning agent) through all of the drink preparation modules 558 to 562 and the respective pipework and outlet nozzles 512a to 512d for each of the modules 558 to 562 to be cleaned in an automated and convenient way.

As the cleaning chamber 584 is sealed, a cleaning fluid can be circulated for a predetermined duration prior to being drained to the external drain 582. The different drink preparation modules 558 to 562 may be cleaned individually. However, in some embodiments, cleaning fluid may be circulated through a plurality of the drink preparation modules 558 to 562 in series or parallel prior to being discharged to the drain 582. It will be appreciated that further conduits than those shown in FIG. 5 may be required to achieve a sequential flow through the modules 558 to 562.

The cleaning process may comprise a residual flushing phase in which hot and/or cold water is flushed through each of the drink preparation modules 558 to 562 and associated pipework in turn prior to being drained via the external drain 582 via the cleaning chamber 584. The cleaning process may, additionally or alternatively, comprise a sanitising phase in which a cleaning fluid comprising a cleaning agent is circulated through the various drink preparation modules 558 to 562. In some embodiments, the cleaning fluid may be created within the cleaning module 564.

In order to create the cleaning fluid within the cleaning module 564, hot water may be circulated through the cleaning module 564 and hot water module 566 via the cleaning chamber 584 and associated pipework. The cleaning module 564 may be configured to add a cleaning agent to the hot water in order to prepare a hot cleaning fluid comprising an appropriate cleaning agent. The hot water may be continuously circulated around the cleaning module-water heater module loop to provide a suitably mixed and heated cleaning fluid. Once prepared, the sanitising phase may continue by circulating the prepared cleaning fluid through each of the drink preparation modules 558 to 562 individually or in series via the cleaning chamber 584 in a closed loop. Following the sanitising phase, the cleaning process may comprise a cleaning fluid flushing phase in which cold and/or hot water is used to flush one or more of the drink preparation modules 558 to 563 to the drain 582 via the cleaning chamber 584. The cleaning phase may additionally or alternatively include an air purge in which air is allowed to flow through one or more of the various modules, conduits, nozzles 512*a-e* and cleaning chamber in order to displace any residual cleaning fluid and/or water. As such the drink dispensing apparatus 500 may comprise one or more air source and vents for introducing and optionally forcing air through the cleaning chamber 584.

By way of example, to clean the coffee module 558, cold water may be provided to the water heater module via the isolation valve 575 and check valve 573. Once heated, valves 574 and 577 may be opened so as to route the hot water through the coffee module 577 and pipe which connects the coffee module 558 to the nozzle 512*a*. Hot water then passes into the cleaning chamber 584 where it is contained by the cleaning chamber housing 514, nozzle arrangement 512 and seals 528, prior to being extracted via the cleaning return nozzle 512*e* to the external drain 582 via valve 580.

In the sanitising phase, the water heater module 566 is connected to the cleaning module 564 via valves 574, 577 and 584, via the cleaning chamber 584. The hot water is used to dissolve the cleaning agent within the cleaning module 564 and returned to the water heater module 566 via the check valve 572. The water may be continuously circulated through the hot water module 566 and cleaning module 564 in this way until a suitable temperature and/or amount of cleaning agent has been dissolved into the hot water to provide a suitable cleaning fluid. Following this, the left-hand flow path of valve 574 can be opened so as to bypass the water heater module 566 and valve 577 opened to allow the cleaning fluid to flow through the coffee module 558 and into the cleaning chamber 584. The outlet of the valve extending to the drain 580 may be closed at this time.

Once a sufficient flow of water has passed through the coffee module 558 the drain outlet of valve 580 can be opened such that the spent cleaning fluid is dispensed from the external drain. The outlet of valve 580 connecting to the cleaning module 564 can be closed at this time.

The cleaning fluid flushing phase is similar to the residue flushing phase but instead of the water passing through the water heater module 566, cold water inlet valve of valve 574 is opened such that it can bypass the hot water module 566 and flow directly to the coffee module 558 and external drain 582.

It will be appreciated that the other drink dispensing modules 560 and 562 may be cleaned in a similar way via the control of valve 576 and 579 and sequentially for each of the cleaning phases. It will also be appreciated the cleaning process may vary from the one described above. For example, in some embodiments, the cleaning fluid may be prepared externally to the drink dispensing machine 500 or may be provided as a ready-mixed solution. In which case the steps associated with preparing the cleaning fluid may be omitted. In other embodiments, the residual flush may not be required or may be achieved using a closed cleaning circuit. Further, the cleaning chamber 584 may be purged of water or cleaning fluid using air.

As noted above, the drink dispensing apparatus 500 may comprise a controller 568 which is configured to control the various parts of the drink dispensing apparatus 500 to allow drinks to be prepared and dispensed and to undertake any necessary cleaning processes upon instruction from a user. Thus, although not shown, the controller 568 connected to each of the valves and modules of the drink dispensing machine 500 to allow the actuation and sensing needed during the preparation of a drink or a cleaning process. The controller 568, actuators and sensors provided at the various parts and lines of communication for sending and receiving commands or data to and from the sensors are conventional and well known in the art and not described in detail here.

It will be appreciated from the disclosure as a whole that the controller 568 may also be configured to operate the drive mechanism 300 such that the cleaning chamber housing 514 may be moved between the stowed and deployed positions as required during a cleaning process. Thus, the cleaning process described herein in relation to the apparatus 500, may commence with the movement of the cleaning chamber housing 514 into the deployed position such that it is sealable coupled to the nozzle arrangement 512 to form the cleaning chamber 584.

The controller 568 may comprise a user interface. The user interface may be configured to receive instructions from a user and/or to provide a display for providing a user with information. The user interface may, for example, comprise an output display 588 and an input device 586 such as a touch screen input device or one or more buttons to enable a user to select options or operating the machine.

The controller 568 may be configured to allow a user to select a beverage type to dispense or to select a cleaning operation, for example, and/or be configured to providing levels of stock in the machine 500 or the operating status, for example.

The controller 568 may comprise a timer and/or scheduler to allow cleaning operations to be carried out at specified times and/or according to a predetermined schedule. Thus, the controller 568 may be configured to carry out a cleaning operation automatically and without user interaction. Due to the configuration of the cleaning chamber housing 514 and nozzle arrangement 512, the user is not required to carry out any specific actions with regards to a cleaning operation of the drink dispensing apparatus 500 and so cleaning can be scheduled in line with a preferred time of day or week, such of out of hours and/or after a predetermined time of operation.

It will be appreciated that the nozzle arrangement and cleaning chamber housing of the present disclosure is advantageous as it allows a cleaning circuit to be created within a drink dispensing apparatus. This is not only convenient, it also allows the cleaning of the apparatus to be largely automated.

A further advantage of the cleaning chamber housing and nozzle arrangement is that each of the fluid pathways for each of the drinkable fluids can be cleaned from the drink preparation modules to the nozzles, including the exterior of the nozzles.

Further, as the cleaning chamber created by the nozzle arrangement and cleaning chamber housing is sealed in some embodiments, the cleaning circuit can be used to pass one or more of cold, hot and cleaning fluid around the various drink preparation modules of the drink dispensing apparatus. The cleaning circuit may be closed circuit and/or an open circuit in which circulated fluid is dispensed to an external drain. Further, the cleaning fluid can be continuously circulated or left to soak to enable a suitable level of cleanliness to be achieved.

The apparatus may heat the cleaning fluid to a temperature of at least 50° C., preferably at least 60° C., preferably at least 70° C., and most preferably approximately 75° C.

The apparatus may circulate the cleaning fluid through all sub-systems at the elevated temperature, for a selected time period, for example, at least 2 minutes, preferably at least 3 minutes, preferably at least 4 minutes, and more preferably at least 5 minutes.

The cleaning fluid may then be drained from the dispensable fluid circuit. Preferably, all subsystems may then flushed to remove any remaining cleaning fluid. The outlet dock may then be opened to return the apparatus to the dispensing mode.

The apparatus may be used in an intermediate rinse mode in which the outlet dock may be closed to isolate the source of dispensable fluid, so that the apparatus can go into an intermediate rinse mode. Preferably, all sub-systems may then be flushed to remove any dispensable fluid remains from the dispensable fluid circuit. After this, the outlet dock may then be opened to return the apparatus to the dispensing mode.

The one or more embodiments are described above by way of example only. Many variations are possible without departing from the scope of protection afforded by the appended claims.

The invention claimed is:

1. A drink dispensing apparatus, comprising:
a nozzle arrangement comprising a plurality of nozzles, wherein at least one of the plurality of nozzles is an outlet nozzle for dispensing a drinkable fluid and wherein at least one of the plurality of nozzles is a cleaning return nozzle; and,
a cleaning chamber housing repeatably movable between a stowed position and a deployed position for cleaning the nozzle arrangement, the cleaning chamber housing comprising an internal cavity in which the plurality of nozzles are sealably received when in the deployed position;
wherein the plurality of nozzles are configured to extend into the internal cavity when the cleaning chamber housing is in the deployed position; and
wherein the cleaning return nozzle is provided at the lowest point of the internal cavity relative to the at least one outlet nozzle.

2. The apparatus of claim 1, wherein the cleaning chamber housing comprises a peripheral seal which seals against the nozzle arrangement so as to collectively seal the plurality of nozzles within the internal cavity.

3. The apparatus of claim 1, wherein the plurality of nozzles extend from a proximal end attached to a body of the nozzle arrangement to a distal end in which the distance between the proximal end and distal end defines a length of each nozzle, wherein the cleaning return nozzle has a length which is the greatest out of the plurality of nozzles.

4. The apparatus of claim 1, wherein the plurality of outlet nozzles comprises at least one or more of the group comprising: a coffee outlet nozzle, a chocolate outlet nozzle, a milk outlet nozzle, a water outlet nozzle.

5. The apparatus of claim 1, wherein the cleaning chamber housing comprises a well for each of the outlet nozzles, each well comprising a well sidewall defining a cleaning cavity which receives a terminal end of the respective outlet nozzle, the well sidewall being configured to redirect cleaning fluid ejected from the respective outlet nozzle along an exterior surface of the respective outlet nozzle.

6. The apparatus of claim 5, wherein each well comprises a well base, the well base being elevated with respect to a base of the cleaning chamber housing.

7. The apparatus of claim 5, wherein each well sidewall comprises a well drain from which cleaning fluid can flow from the well into the cleaning chamber housing.

8. The apparatus of claim 7, wherein the well drain comprises an aperture in the sidewall of each well.

9. The apparatus of claim 8, wherein the well drain faces the cleaning return nozzle so as to direct an outflow of cleaning fluid towards the cleaning return nozzle.

10. The apparatus of claim 1, further comprising a drive mechanism operable to move the cleaning chamber housing between the stowed position and the deployed position and vice versa.

11. The apparatus of claim 10, wherein the drive mechanism comprises a shuttle track along which the cleaning chamber housing is driven to move between the stowed and deployed positions.

12. The apparatus of claim 11, wherein the drive mechanism comprises a drive arm which is rotatable so as to slide the cleaning chamber housing along the shuttle track.

13. The apparatus of any of claim 12, wherein the shuttle track receives a shuttle engagement member of the cleaning chamber housing, the shuttle engagement member being configured to rotate in and slide along the shuttle track under the influence of the drive arm.

14. The apparatus of claim 13, wherein the shuttle engagement member is provided at a first end of the cleaning chamber housing and the drive arm is drivably connected to a second end of the cleaning chamber housing.

15. The apparatus of any of claim 1, wherein the cleaning chamber housing is rotatably urged against the nozzle arrangement.

16. The apparatus of claim 1, further comprising one or more drink preparation modules, wherein the cleaning chamber housing forms part of a cleaning circuit in which cleaning fluid is circulated through the one or more drink preparation modules and the cleaning chamber housing.

17. A method of cleaning the drink dispensing apparatus according to claim 1, the method comprising:
sealably engaging the nozzle arrangement and cleaning chamber housing to provide a cleaning chamber around the plurality of nozzles; and
circulating a cleaning fluid through the cleaning chamber.

18. The method of claim 17, wherein the drink dispensing apparatus comprises a drink preparation module, wherein the cleaning fluid is circulated through the drink preparation module prior to being sent to an external drain.

19. The method of claim 17, further comprising purging residual fluid from the cleaning chamber using an air flow.

* * * * *